W. J. DOYLE.
BICYCLE STAND LOCK.
APPLICATION FILED JUNE 2, 1915.

1,218,843.

Patented Mar. 13, 1917.

Witnesses
G. T. Baker
B. M. Kent

Inventor
William J. Doyle
by Foster Freeman Watson & Cort
Attorneys

THE NORRIS PETERS CO., PHOTO-LITHO., WASHINGTON, D. C.

UNITED STATES PATENT OFFICE.

WILLIAM J. DOYLE, OF ROME, NEW YORK.

BICYCLE-STAND LOCK.

1,218,843. Specification of Letters Patent. Patented Mar. 13, 1917.

Application filed June 2, 1915. Serial No. 31,741.

*To all whom it may concern:*

Be it known that I, WILLIAM J. DOYLE, a citizen of the United States, and resident of Rome, county of Oneida, State of New York, have invented certain new and useful Improvements in Bicycle-Stand Locks, of which the following is a specification.

This invention relates to bicycles and motorcycles and more particularly to means for locking the stand, which supports the rear wheel off the ground, so that the stand cannot be thrown to the inoperative position by an unauthorized person. It is the object of the invention to provide a simple and inexpensive device of the character described which will be capable of securely locking the stand and in which the parts of the lock are so arranged as to make it practically impossible to unlock the stand without the key which is provided for the lock.

One embodiment of my invention is illustrated in the accompanying drawings, in which, Figure 1 is a fragmentary side elevation of a rear bicycle wheel and a portion of the bicycle frame, the stand being shown in the inoperative position;

Figure 4:
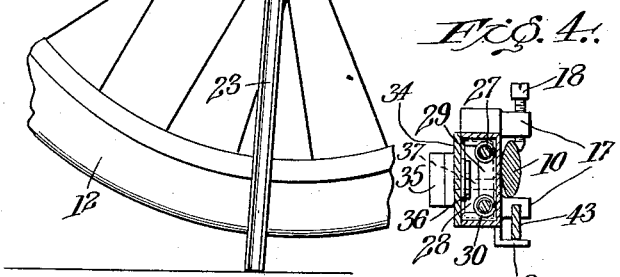
Fig. 4 is a detail section on the line 4—4 of Fig. 2.
Figure 4:
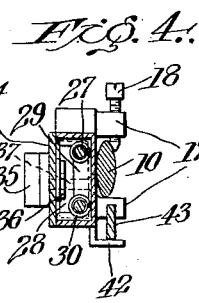

Referring to the drawings, 10 indicates a part of the bicycle frame to which there is secured the axle 11 for the wheel 12. Arranged at the opposite ends of the axle 11 and secured thereon by the nuts 13 and 14 are the brackets 15 and 16. Each of these brackets comprises a vertical plate having inwardly projecting lugs 17 between which the frame members 10 are arranged so that the brackets 15 and 16 are securely held against turning movement on the axle 11. In order to more firmly secure the brackets to the frame, the upper lugs 17 each have a set screw 18 which engages the part 10 of the frame, as clearly shown in Fig. 4.

The bracket 15 is provided with outwardly projecting walls 19 which form a casing for latch mechanism to be hereinafter described. The bracket 15 also is provided with an outwardly projecting lug or abutment 20 which is formed integral with the walls 19.

Figure 2:
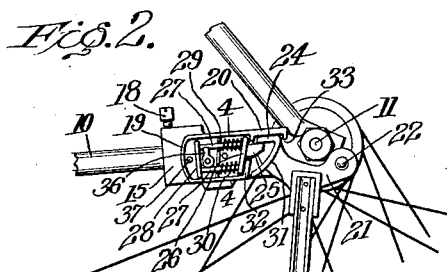
Fig. 2 is a view similar to Fig. 1 but showing the stand in the operative position for supporting the wheel off the ground, the cover plate of the latch casing being removed to show the latch mechanism.
Figure 3:
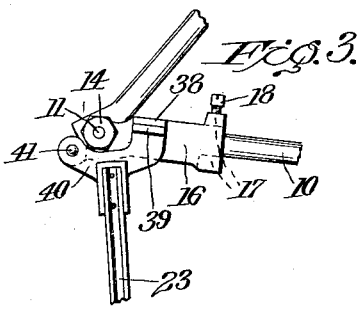
Fig. 3 is a fragmentary elevation of the parts on the opposite side of the wheel from those shown in Figs. 1 and 2.

The bracket 15 has an arm 21 pivoted thereto at 22 and to this arm there is secured, by means of rivets or in any other suitable manner, one end of the usual U-shaped stand 23. The free end of the arm 21 has a laterally projecting lug 24 which is adapted to engage the lug 20, to limit the swinging movement of the arm 21, and also adapted to be engaged by the latch bolt 25, as clearly shown in Fig. 2. The bolt 25 is carried by a bar 26 from which extend two pins 27, these pins being also connected by a bar 28. The pins 27 extend through a partition 29 and have coiled thereon springs 30, these springs being arranged between the bar 26 and the partition 29 and normally pressing the bolt 25 to the position shown in Fig. 2, wherein it engages the lug 24 and coöperates with the lug 20 to secure the stand in the position shown.

In order to thoroughly conceal the bolt 25 and prevent its being pried out of its locking position the arm 21 has formed integral therewith a laterally projecting wall 31, which extends from the lug 24 downwardly into close proximity to the end wall 32 of the latch casing. The lug 20 has a downwardly projecting flange 33 which prevents the insertion of a pry between the lugs 20 and 24.

Figure 1:
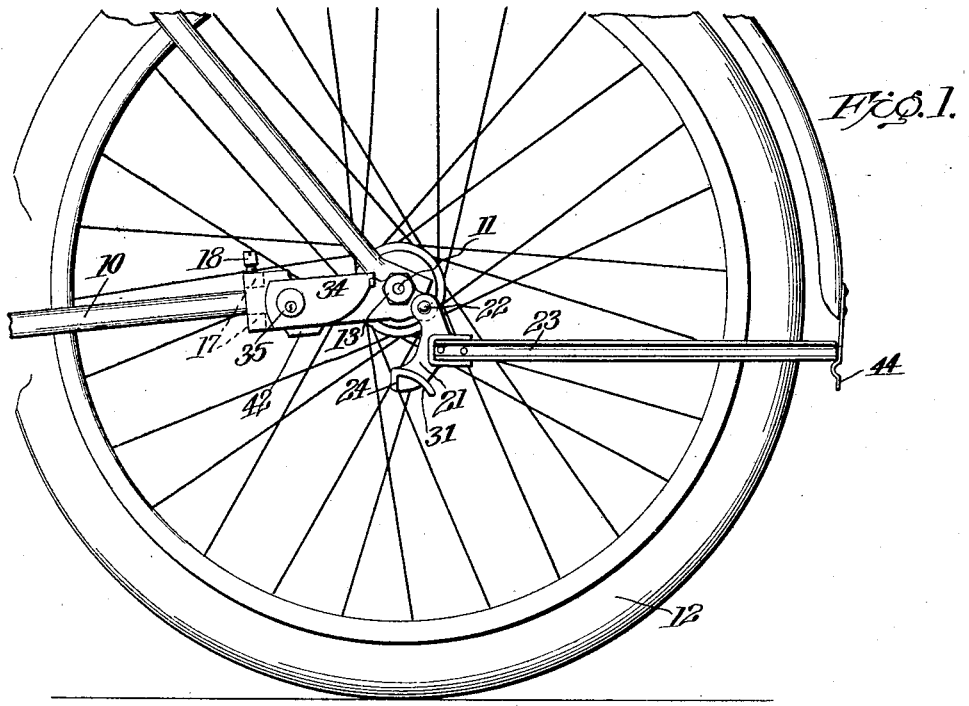

The latch casing is provided with a cover plate 34 which carries a lock operating mechanism 35, preferably of the Yale tumbler type, this mechanism being preferably key-actuated and having an arm 36 which is swung into engagement with the bar 28, when the key is turned in the lock 35, and thus withdraws the bolt 25 from engagement with the lug 24 and permitting the stand 23 to be thrown into the position shown in Fig. 1. The cover plate 34 is secured in position by screws 37 which extend through the bracket 15 and enter the plate 34 on the inner side of the latter. These screws are concealed by the frame member 10 and therefore when the parts are in position on a bicycle the screws cannot be removed to permit the detachment of the plate 34 so as to give access to the latch mechanism and permit its being actuated without the key for the mechanism 35.

The bracket 16 has an outwardly projecting lug 38 which is adapted to be engaged by a lug 39 on the arm 40, this arm being pivoted to the bracket 16 at 41 and having the U-shaped stand 23 secured thereto.

The bracket 15 carries an inwardly projecting lug 42 which is adapted to support the anchor arm 43 of the coaster brake with which bicycles are now usually provided.

The operation of the mechanism is as follows: When it is desired to stand the vehicle for a time the U-shaped support 23 is dropped from the position shown in Fig. 1, where it is held by a spring clip 44, to the position shown in Fig. 2. In swinging to this position the lug 24 strikes the lower beveled surface of the bolt 25 and forces the latter backward against the tension on the springs 30 to permit the lug 24 to engage the lug 20. The lug 39 on the arm 40 engages the lug 38 so that both sides of the stand are securely held. When the bolt 25 is sprung in under the lug 24 the latter is locked against the lug 20, as clearly shown in Fig. 2. It will also be seen that the stand can not be thrown to the position shown in Fig. 1 without drawing back the bolt 25 and this can only be done by actuating the mechanism 35 by means of the key provided therewith.

Having described the invention what is claimed is:—

1. In a device of the class described, the combination of a bracket provided with walls forming a lock casing, means for securing said bracket to the rear axle and one member of the rear fork of a bicycle, a member pivoted to said bracket and having means rigid therewith adapted to positively engage one of said walls and limit the swinging movement of said member, an automatically operating latch mounted on said bracket within the walls of said casing and having a bolt slidable in the same plane as the member swings and adapted to secure said means against the above mentioned wall, a removable cover plate for said casing, and a key-actuated rotatable mechanism carried by said plate and adapted to release said latch.

2. In a device of the class described, the combination of a bracket adapted to be secured on the bicycle axle and comprising a vertical plate having laterally projecting walls on the outer side thereof forming a latch casing and lugs on its inner side adapted to coöperate with the bicycle frame to secure the bracket against turning about said axle, a member pivoted to said bracket and having a lug adapted to positively engage one of said walls and limit the swinging movement of said member, a spring actuated latch adapted to engage the last mentioned lug and secure the same against the above mentioned wall, and mechanism for releasing said latch.

3. In a device of the class described, the combination of a pair of brackets adapted to be secured on the opposite ends of the bicycle axle and comprising vertical plates each having a pair of inwardly projecting lugs adapted to engage the bicycle frame, and outwardly projecting lugs or abutments, one of said plates having a casing formed on the outer side thereof, a stand pivoted to said brackets and having means adapted to engage each of said outwardly projecting lugs to limit the swinging movement of the stand, a spring actuated latch arranged in said casing and adapted to engage one of said means to lock the stand in position to support the bicycle wheel off the ground, a removable cover plate for said casing, and a mechanism carried by said cover and adapted to release said latch.

In testimony whereof I affix my signature.

WILLIAM J. DOYLE.

Copies of this patent may be obtained for five cents each, by addressing the "Commissioner of Patents, Washington, D. C."